United States Patent [19]
Maclean et al.

[11] Patent Number: 5,662,294
[45] Date of Patent: Sep. 2, 1997

[54] ADAPTIVE CONTROL SURFACE USING ANTAGONISTIC SHAPE MEMORY ALLOY TENDONS

[75] Inventors: Brian J. Maclean, Daniel, Wyo.; Bernard F. Carpenter, Littleton; Mohan S. Misra, Golden, both of Colo.

[73] Assignee: Lockheed Martin Corporation, Bethesda, Md.

[21] Appl. No.: 559,860

[22] Filed: Nov. 20, 1995

Related U.S. Application Data

[63] Continuation-in-part of Ser. No. 203,096, Feb. 28, 1994, abandoned.

[51] Int. Cl.$^6$ ............................ B64C 3/18; B64C 3/44; B64C 9/04; B63B 3/38
[52] U.S. Cl. ................. 244/219; 244/123; 244/133; 244/201; 114/140
[58] Field of Search ............. 244/219, 201, 244/123, 133, 75 R; 114/140, 162, 332

[56] References Cited

U.S. PATENT DOCUMENTS

| | | | |
|---|---|---|---|
| 5,114,104 | 5/1992 | Cincotta et al. | 244/219 |
| 5,150,864 | 9/1992 | Roglin et al. | 244/219 |
| 5,186,420 | 2/1993 | Beauchamp et al. | 244/219 |
| 5,367,970 | 11/1994 | Beauchamp et al. | 114/140 |
| 5,374,011 | 12/1994 | Lazarus et al. | 244/75 R |

*Primary Examiner*—Andres Kashnikow
*Assistant Examiner*—Virna Lissi Mojica
*Attorney, Agent, or Firm*—Julian C. Renfro, Esq.; Gay Chin, Esq.; Patrick Hogan, Esq.

[57] ABSTRACT

A pliant, controllable contour control surface comprising a first flexible facesheet formed to a first initial contour of the control surface, and a second flexible facesheet formed to a second initial contour of the control surface. The first and second facesheets each have a set of prestrained shape memory alloy tendons embedded therein, extending from a leading edge to a trailing edge of the control surface. Each set of the shape memory alloy tendons is separately connected to a controlled source of electrical current such that tendons of the first and second flexible facesheets can be selectively heated in an antagonistic, slack-free relationship, to bring about a desired modification of the configuration of the control surface. A computer based control system is utilized for maintaining a constant temperature of the antagonists to establish conditions conducive to the stress induced transformation from austenite to martensite, accomplished by causing constant current to flow through the antagonists. Proportional/integral (PI) control is utilized in connection with the opposing shape memory tendons.

11 Claims, 6 Drawing Sheets

ADAPTIVE CONTROL SURFACE USING ANTAGONISTIC SHAPE MEMORY ALLOY TENDONS

RELATIONSHIP TO PREVIOUS APPLICATION

This is to be regarded as a Continuation-in-Part of our patent application entitled "ADAPTIVE CONTROL SURFACE USING SHAPE MEMORY ALLOY TENDONS," Ser. No. 08/203,096, filed Feb. 28, 1994, now abandoned.

BACKGROUND OF THE INVENTION

1. Field of the Invention

The invention relates to adaptive control surfaces for aircraft and water craft, and more particularly to such controls having facesheets containing tendons formed from shape memory alloys to form a compliant, controllable surface.

2. Description of the Prior Art

Conventionally, attitude control of aircraft, missiles, undersea craft, and the like is accomplished by means of control surfaces operated from mechanically, hydraulically, or electrically controlled actuators externally coupled to the surfaces. Such systems are typically gimballed about their attachment point and/or employ trailing edge flaps articulated off the control surface. These systems display limited dynamic fluid flow performance manifested in terms of flow separation and reduced coefficient of lift at moderate to high angles of attack.

Prior art control systems are often mechanically complex. Such systems may include lever arms, gears and drives, torsion rods, hydraulic devices, electrical motors, interconnects, and the like. Such elements add weight and complexity to the systems, and often produce maintenance and supply problems.

There is a need for a compliant control surface having no external actuators that can be remotely controlled by electrical signals without requiring transducers, servo mechanisms, or other mechanical and electrical devices.

It is known that shape memory alloys (SMAs) utilize a reversible crystalline phase transformation to recover their original heat-treated shape when heated above a critical transformation temperature range. The recoverable strain can be as high as 8% and can generate recovery stresses as high as 100 ksi. [Miyazaki et al[1] (1989) and Perkins[2] (1975).] SMA wire "tendons", can be used as embedded actuator elements to control the level of facesheet strain in adaptive structural components which utilize sandwich panel construction. As such facesheet strain is varied, the degree of curvature and magnitude of tip deflection will change and can be precisely controlled.

In an exemplary configuration, a core material, such as honeycomb or foam, is bonded to the active facesheet on one side and to a conventional composite facesheet, such as fiberglass/epoxy or graphite/epoxy, on the other side. Electrical resistance heating of the SMA wires is used to produce facesheet contraction (and, therefore, the amount of panel deformation) and a closed-loop strain/displacement sensor feedback loop is used to provide control of the contraction.

Thus, selective control of the heating provides a controlled amount of deformation of the control surface in which these wires are used, whereas the cooling of the SMA wires brings about elongation. One embodiment of the invention making use of this principle may take the form of a control surface constructed to have a single facesheet containing tendons, thus to utilize a flex-biased actuation of the control surface. In other words, contraction of the SMA wires may produce actuation, and the spring action resulting from the stiffness of the panel is used to provide a restoring force when the heating is reduced.

In another implementation utilizing SMA tendons, we may provide a control surface employing an SMA composite facesheet on each side thereof. This construction produces an antagonistic type actuation, for in accordance with this arrangement, the strains in the opposing panels are independently controlled in a differential manner so as to produce curvature of the control surface in either direction from a neutral point.

Significant applications made possible by the use of this invention include adaptive antenna reflector surfaces for balancing thermally induced surface distortions, as well as beam steerage and phasing; mission adaptive aircraft wings for extended range and expanded flight envelope, compliant control fins for marine vehicles such as submarines, torpedoes and ships to reduce noise, turbulence, and system weight, and stators for propulser inflow control and intrapulser flow management. Such surfaces have the ability to improve flow over the control surface minimizing wake interference and improve propulsor inflow.

We are aware of U.S. Pat. No. 5,114,104 granted to Manuel Cincotta et al entitled "ARTICULATED CONTROL SURFACE," which has a control surface shaped by contracting and elongating shape memory alloys embedded within the control surface. An interesting critique of the Cincotta et al patent was contained in the Beauchamp et al U.S. Pat. No. 5,186,420 entitled "ARTICULATED FIN/WING CONTROL SYSTEM," of which Manuel Cincotta, Jr. was a co-inventor. In Column 2 of the Beauchamp et al patent it was stated that the Cincotta et al patent involved a configuration having the disadvantages of low mechanical advantage and severe space limitation. The comment went on to mention that the space limitations result in limiting the number and length of wires which can be used, thus limiting the maximum deflection angle which can be obtained on the control surface.

Another relevant patent is the Roglin et al U.S. Pat. No. 5,150,864 entitled "VARIABLE CAMBER CONTROL OF AIRFOIL," which describes a control surface that is more hinge-like than the instant invention. Roglin's control surface depends on articulation of a trailing edge about a hinge point using an elastomeric strip to maintain compatibility across the control surface. Curvature is confined to a small portion of the foil's coil, and this patentee exhibits no recognition of an antagonistic control arrangement.

It was in an effort to overcome the disadvantages of these and other relatively ineffective prior art devices that the present invention was evolved.

SUMMARY OF THE INVENTION

In accordance with a preferred embodiment of our invention we have provided a controllable contour control surface comprising a first flexible facesheet formed to a first initial contour of the control surface, and a second flexible facesheet formed to a second initial contour of the control surface. The first and second facesheets each have a set of prestrained shape memory alloy tendons embedded therein, extending from a leading edge to a trailing edge of the control surface. Each set of the shape memory alloy tendons is connected to a controlled source of electrical current, with the shape memory alloy tendons of one facesheet being in an antagonistic relationship to the shape memory alloy tendons of the other facesheet.

We utilize a control system for providing a constant current flow to the opposing tendons so that such tendons are in an austenitic state when the control surface is operated at a neutral position. The tendons of one facesheet, when heated by the passage of a selected amount of electric current therethrough, experience a stress induced transformation to the martinsitic phase, under the application of the stress generated by contraction of the controlled set of shape memory actuators, enabling a desired amount of deflection of the trailing edge to be achieved.

The control system maintains a constant temperature of the tendons of the facesheet that at a given moment are in an antagonistic relationship to the tendons of the other facesheet, to establish conditions conducive to the stress induced transformation of austenite to martensite.

Control means are provided for reversing the operational modes of the facesheets as the control surface moves from a deflection to one side of the neutral point, to a deflection on the other side of the neutral point, in response to a command signal.

It is therefore a principal object of the invention to provide a compliant control surface, also referred to as a winglet, having SMA tendons embedded in facesheets thereof, and a control system for electrically controlling the curvature of the control surface in a precise and highly advantageous manner.

It is another object of this invention to provide a compliant control surface having the capability of being flexed over a wide range using internal heat-controlled tendons, with the positioning of such surface being controlled by externally-generated electrical currents that may be utilized in a closed loop system, either manually or preprogrammed.

It is yet another object to provide in accordance with one embodiment of this invention, a method of controlling the uniform deformation of a winglet section. Using embedded shape memory actuator elements and implementing a control approach based on positional sensor feedback, with variations in applied loads and ambient conditions being effectively compensated for within the dynamic response capability of the system.

It is a particularly significant object of this invention to provide a compliant control surface and control system that is sufficiently versatile as to make use either of a control surface constructed to have a single SMA facesheet containing tendons, thus to utilize a flex-biased actuation of the control surface, or else a control surface employing an SMA composite facesheet on each side thereof, so as to produce a highly effective antagonistic type actuation.

It is still another object of this invention to utilize SMA tendons embedded in the facesheets of both sides of the control surface, with this mode of operation resulting in the antagonists always being tensioned and regardless of their state at a particular moment, always contributing in a desirable manner to the bending stiffness of the control surface.

It is yet still another object of this invention to provide a control surface utilizing SMA tendons embedded in both sides of the control surface that function in an antagonistic relationship, with this resulting in the need for fewer of the shape memory tendons in order for a given amount of control effort to be achieved, thus decreasing actuation power requirements.

It is yet another object to provide a control surface utilizing antagonistic actuation such that upon a loss of power, the control surface automatically returns to a "fail safe" neutral position.

It is yet another object of this invention to provide a computer based control system responsible for maintaining the constant temperature of the antagonists while providing control of the opposing shape memory wires, this being accomplished by flowing constant current through the antagonists while providing proportional/integral (PI) control of the opposing wires.

It is yet another object of this invention to provide a novel antagonistic actuation of a control surface involving the combination of a computer control system with shape memory actuators embedded in the control surfaces, with this arrangement enabling a highly advantageous stress induced shape memory transformation to occur rather than the more conventional temperature induced transformation on the antagonistic facesheet actuators.

It is yet another object of this invention to provide a novel antagonistic actuation of a control surface such that less temperature rise is required to convert the antagonistic wires to actuator wires, with this translating into a higher bandwidth of operation as the shape memory transformation rate is controlled by the rate of heat transport in these materials.

It is yet another object of the invention to provide a control surface with a significantly increased coefficient of lift, with such increased coefficient of lift, before the onset of flow separation, being accomplished by using a cambered, compliant control surface in which the inboard edge of the surface is fixed to the body of the control vehicle.

These and other objects, features and advantages of this invention will become apparent from the following Detailed Description when read in conjunction with the drawings.

DETAILED DESCRIPTION OF THE PREFERRED EMBODIMENT

Figure 1:
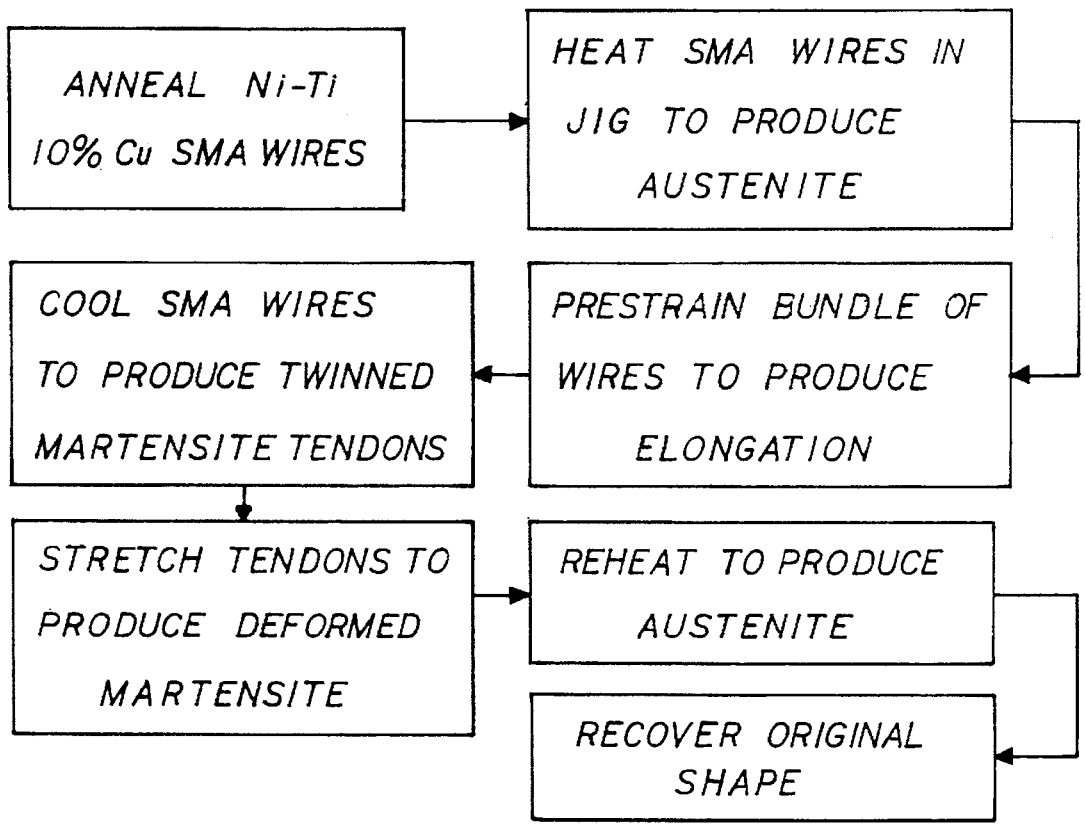
FIG. 1 is a flow diagram showing the preparation and use of shape memory alloy wires as tendons in a compliant control surface.

FIG. 1 illustrates a procedure for treating NiTi-10%Cu SMA wires for use as tendons in a compliant control surface. In a typical embodiment of this invention, a group of NiTi-10%Cu wires, which may be about 0.020" in diameter, are annealed. As an example, this annealing can be carried out for 20 minutes at a temperature of 900° F. Thereafter, the SMA wires are bundled and isothermally strained in a jig at 70° C. to produce the austenitic phase of the material, and to a preselected degree of strain. A prestrain of 4% will be used for explanatory purposes, although it is to be understood that a prestrain up to 8% is possible. The bundle is successively prestrained at a rate of 1 Hz for about 1000 cycles. Typically, this process produces a spontaneous elongation of the wires of about 2% when cooled down from the cycling temperature, and with no applied stress. This two-way memory represents an important facet of wire behavior, which is necessary in order to obtain efficient and repeatable action. See Johnson[3] and Proft et al[4].

As the wires cool, the twinned martensite phase is produced. The SMA wires, after the above described processing, will hereinafter be referred to as "tendons."

When the tendons are installed in the facesheet of a control surface, as described hereinbelow, the wires are stretched by placing them under a preselected strain of 4% relative to their lengths at temperatures above 50° C., in the present example. An electrical resistance wire is used to form the tendons. Thus, heating of the SMA tendons can be accomplished by passing an electrical current therethrough. Such heating causes the tendons to change phase and to tend to recover their original lengths, namely, to become shorter.

Figure 2:
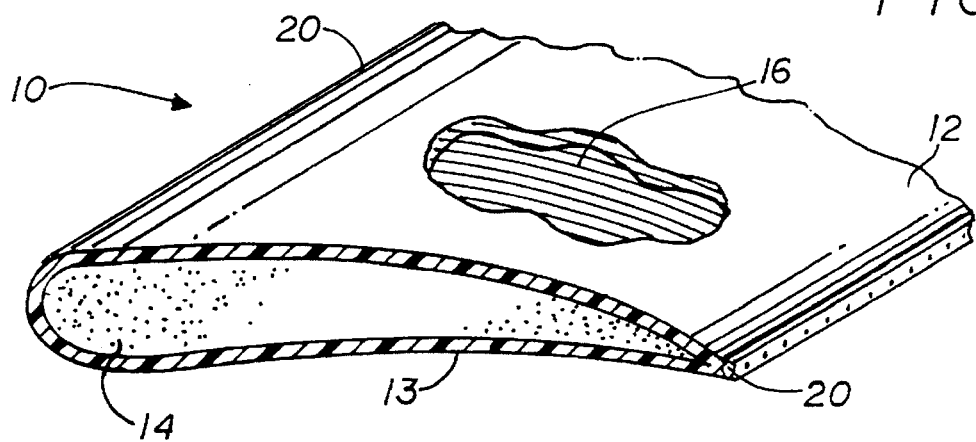
FIG. 2 is a partial perspective view of a typical compliant control surface utilized in accordance with one embodiment of our invention, in which the control surface is cut away to show the utilization of shape memory alloy tendons within the control surface.

A first embodiment of our invention using SMA tendons in a control surface will now be described with reference to FIGS. 2–7. FIG. 2 shows a portion of a control surface 10 having a lower facesheet 13 fabricated from fiberglass epoxy laminate having a thickness of 0.125". To fabricate the top facesheet 12, a set of 0.020" steel wires is collimated at 0.080" centers and temporarily maintained under tension. A sheet of elastomeric thermoplastic material having a typical thickness of 0.030" is placed on each side of the collimated wires, and then consolidated under heat and pressure to form a single 0.060" thick facesheet having the steel wires embedded therein. The steel wires are then removed, leaving a plurality of tunnel holes extending the length of the sheet.

A set of the treated and prestrained SMA tendons 16 is installed through the tunnel holes. As previously mentioned, the SMA tendons can be of a wire diameter of 0.020", and it has been found preferable for these wires to be of NiTi-10% Cu. A honeycomb core 14 is bonded to the underside of the top facesheet 12, such as by the use of a silicon rubber based adhesive. A first electrically conductive bar 20 is attached along the leading edge of the control surface 10, and a second bar 21 is attached along the trailing edge.

Figure 3:
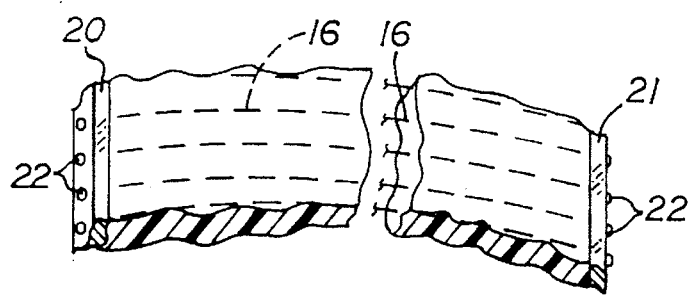
FIG. 3 is a partial view of the control surface of FIG. 2 showing in a fragmentary manner, certain details of anchoring the shape memory alloy tendons.

The ends of tendons 16 are passed through holes in the bars 21 and, in the present example, are then prestrained to about 4% strain. As shown in FIG. 3, tendons 16 may be terminated at the bars 21 by arc welding the end of each tendon to form a ball 22. Balls 22 act as mechanical stops to pull against during contraction of the tendons 16, and also provide an electrical contact with bars 21. Other terminations can be used, involving for example welded balls, swags, solderable lugs or terminations that locally secure the shape memory effect at the contact bar. In a typical application, the electrical resistance between bars 20 and 21 may be on the order of 2 to 3 ohms. As will be recognized, the contraction of tendons 16 deflects surfaces 12 and 13 from their original curvature.

Figure 4:
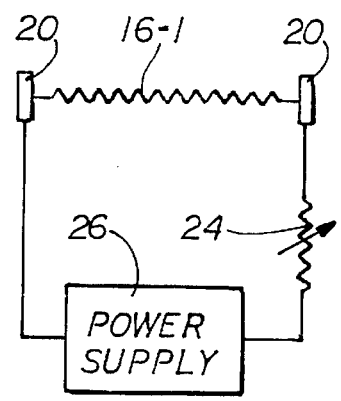
FIG. 4 is a simplified schematic diagram of the procedure for controlling the strain in the tendons of FIGS. 2 and 3.
Figure 5A:
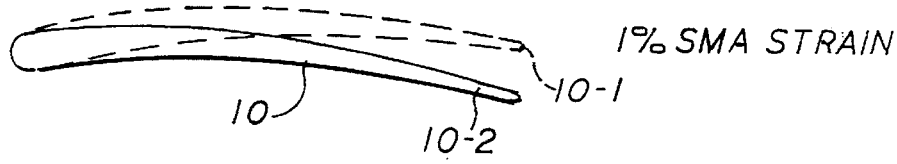
FIGS. 5A through 5D show a typical compliant control surface in accordance with one embodiment of our invention, with each of these figures showing a different amount of facesheet strain and the associated tip deflection of the control surface.
Figure 5B:
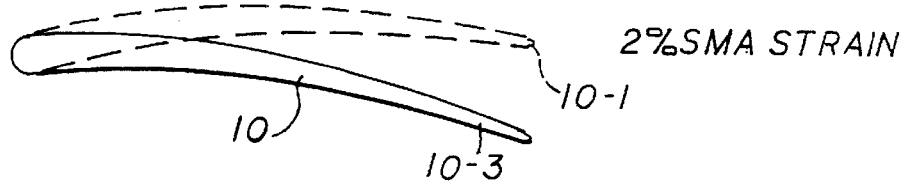
Figure 5C:
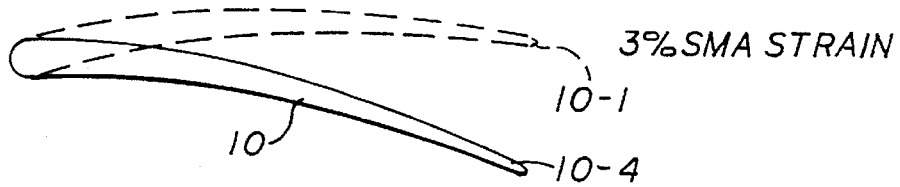
Figure 5D:
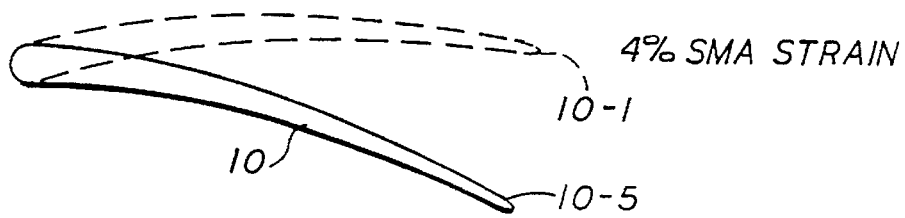

As illustrated in FIG. 4, to control the length of the set of parallel SMA tendons 16-1, an electrical current is passed therethrough, thereby heating the tendons. A current from power supply 26 is controlled by a suitable control element 24 indicated schematically as a variable resistor. As the tendons 16-1 are reheated by the current, the wires change state to the austenitic phase and tend to become shorter, recovering their original length. As the strain is relieved, surfaces 12 and 13 of FIG. 2 and loads thereon provide a vectoring force to return the control surface 10 to its original shape, as a result of the tendons becoming longer, with the control surface deflection thus being reduced. FIGS. 5A–5D show a typical range of deflection of a control surface 10-1 over a range of 1% to 4% strain.

Figure 6:
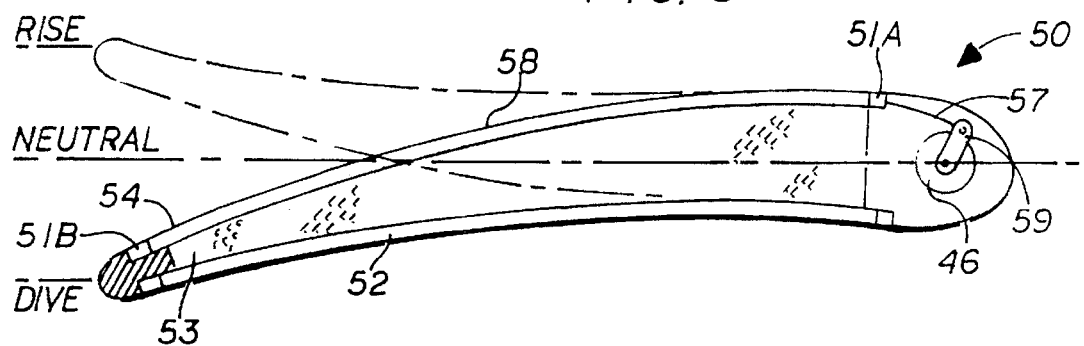
FIG. 6 is a cross sectional view of a compliant control surface of the first embodiment of our invention, with a position measurement transducer utilized in a closed loop control system.
Figure 7:
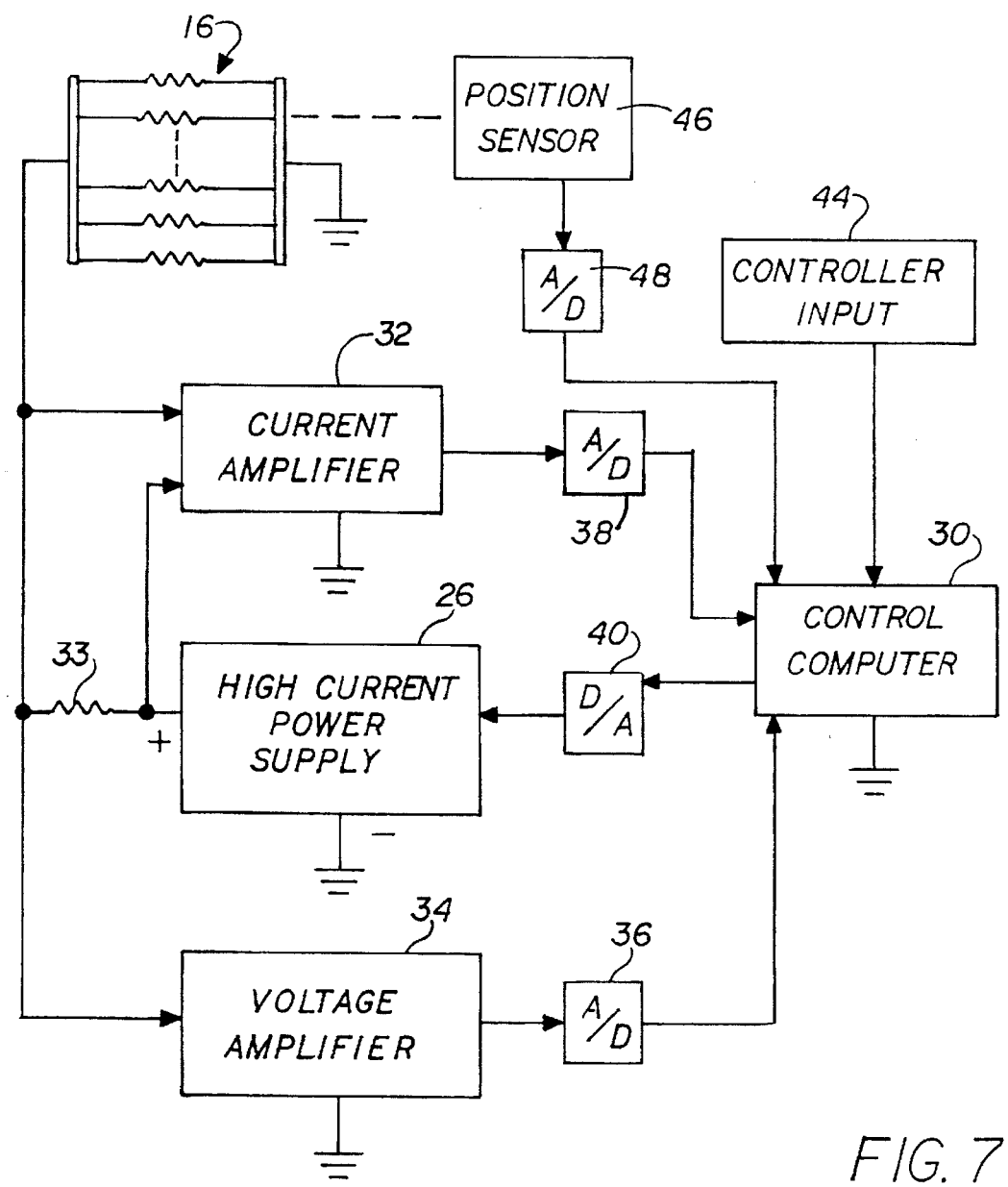
FIG. 7 is a block diagram of a typical control system for controlling a compliant control surface of the first embodiment of our invention.

In FIG. 6 and FIG. 7 we reveal one practical application of this invention, which is to a submersible craft. The preferred control system revealed in these figures represents an example of flex-bias control and involves a single compliant sheet containing shape memory tendons.

FIG. 6 reveals a compliant control surface 50 having an upper facesheet 58 in which a set of SMA tendons 16 such as shown in FIG. 3 are embedded therein, as previously described. SMA tendons 16 are attached to contact bars 51A and 51B in a manner similar to the technique shown in FIG. 3. A lower facesheet 52 is formed of glass-epoxy material, and a honeycomb core 53 is provided. One of the tendons 16 of facesheet 58 is removed and a tungsten wire 57 substituted therefor. The tungsten wire 57 is attached at the trailing edge contact bar, passed through a hole in contact bar 51B, and is attached to arm 59 of a position sensor 46, which may be a rotational variable displacement transducer (RVDT) disposed in the leading edge of control surface 50. As the control surface 50 flexes, wire 57 operates sensor 46 to produce an electrical signal proportional to the tip displacement. Control surface 50 is shown in a dive position, with a rise position indicated in phantom view on this same figure. As will be understood, a single-channel control system may be utilized in accordance with our invention.

FIG. 7 is a simplified block diagram of a single channel closed loop, displacement sensor feedback control system for the embodiment of our invention with which control surface 50 is concerned. A high current power supply 26 is connected to the set of SMA tendons 16 of the control surface. A control computer 30, which in one implementation of our invention may be a digital computer, is responsive to signals from a controller input device 44 to control the current output of power supply 26 via digital-to-analog converter (D/A) 40. Controller 44 may utilize suitable software, and may contain provisions for manual control.

In an alternative implementation of this embodiment, computer 30 may be an analog type, and in such case, A/D converters 36, 38, 48 and D/A converter 40 are not required.

Current flowing through tendons 16 is controlled to provide the desired degree of strain. Position sensor 46 provides feedback to computer 30 through analog-to-digital converter (A/D) 48. The current to tendons 16 through shunt resistor 33 is monitored by current amplifier 32 to provide a current feedback signal to computer 30 via A/D converter 38. Similarly, voltage amplifier 34 monitors the voltage applied to tendons 16 via A/D converter 36. Monitoring of these two parameters allows power consumption to be calculated. These values are utilized to determine if the temperature of the embedded tendons is approaching the temperature associated with the phase transformation limit of the shape memory material. Such information is used to constrain operation of the control surface within design specifications such as maximum fluid velocity, tendon stress and tendon strain. The control law for computer 30 may be a proportional/integral (PI) type, which supplies electrical power to the SMA tendons based on the displacement error sensed by position sensor 46. The control system sampling rates, which are generally 500 to 1000 times faster than the control surface response, are employed in the digital version to maintain control surface displacement accuracy under varying fluid flow conditions.

It is to be understood that electrical resistance heating of the SMA wires can be utilized in accordance with this embodiment of our invention to effectively control facesheet contraction via a displacement sensor feedback loop.

Figure 8:
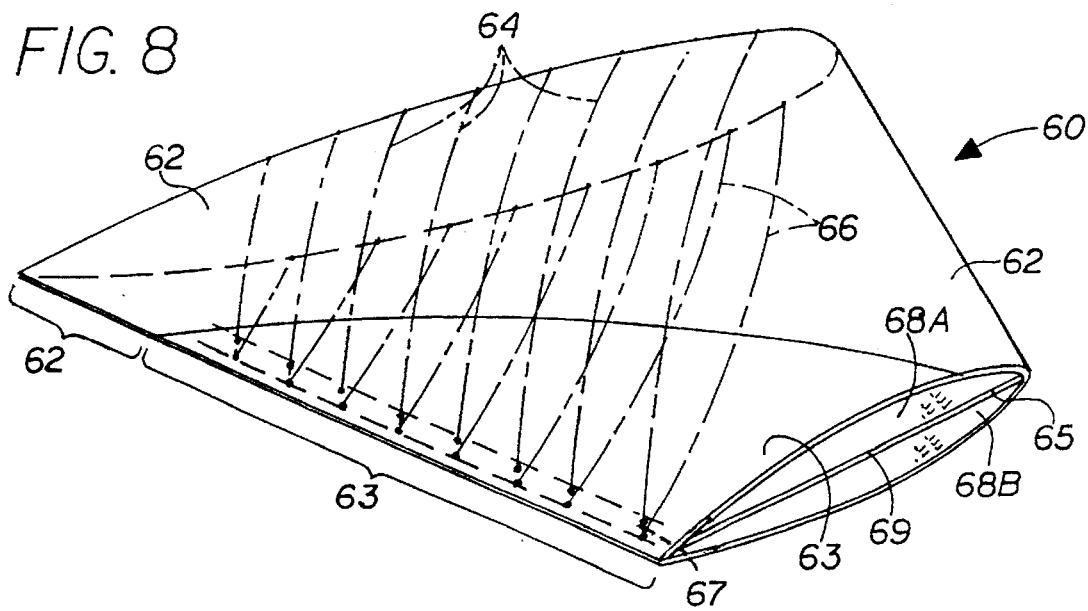
FIG. 8 is a perspective view of a particularly significant embodiment of our invention involving a fin, in a static condition, that utilizes an antagonistic method of operation.
Figure 9:
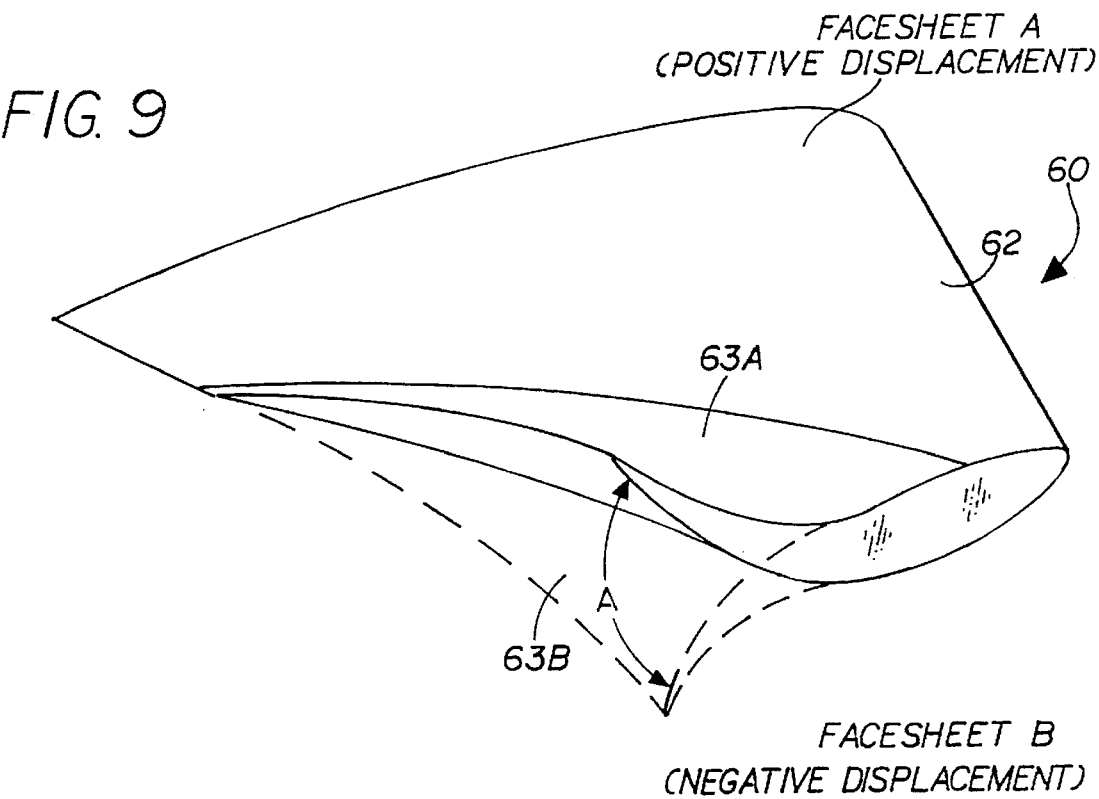
FIG. 9 is a perspective view of the fin of FIG. 8 in which Facesheets A and B are identified, with first and second deflection examples being illustrated.

A particularly important embodiment of our invention involves utilization in conjunction with an antagonistic type of fin control. With reference to. FIGS. 8 and 9, it is to be noted that in this embodiment, both the upper facesheet and the lower facesheet of the control surface utilize a set of SMA tendons embedded therein. The control system provides a constant current flow to the opposing tendons such that they are in an austenitic state when the control surface is operated at a neutral position. When the tendons of one facesheet are heated, the tendons in the opposing facesheet experience an advantageous elongation as they undertake the stress induced transformation to the martensitic phase, allowing the desired tip displacement to be achieved.

It is to be noted that the total stiffness of the control surface is defined by the summation of the structural stiffness and the stiffness contribution from the shape memory wires. During actuation, total stiffness is advantageously maintained or increased by the increased stiffness of the shape memory wires under PI control deforming the control surface. This effect offsets the reduction in stiffness resulting from elongation of the antagonistic shape memory wires as they experience the stress induced transformation to the martensite phase.

It is important to understand that antagonistic operation of the control surface is necessary to provide robust displacement control about the neutral position. The word robust, as we utilize this term, is intended to represent the ability of the control surface to maintain its tip deflection under the influence of variable hydrodynamic or aerodynamic loads.

Antagonistic operation is defined as the application of a control signal to the shape memory actuator allowing it to experience an increase in temperature generating contraction of the compliant control surface facesheet. During this event the opposing shape memory actuators (the antagonists) are being maintained at a temperature above the austenite finish temperature (approximately 70° C.).

Under the application of the stress generated by contraction of the controlled set of shape memory actuators the antagonists are forced to experience a stressed induced transformation to martensite.

Figure 11:
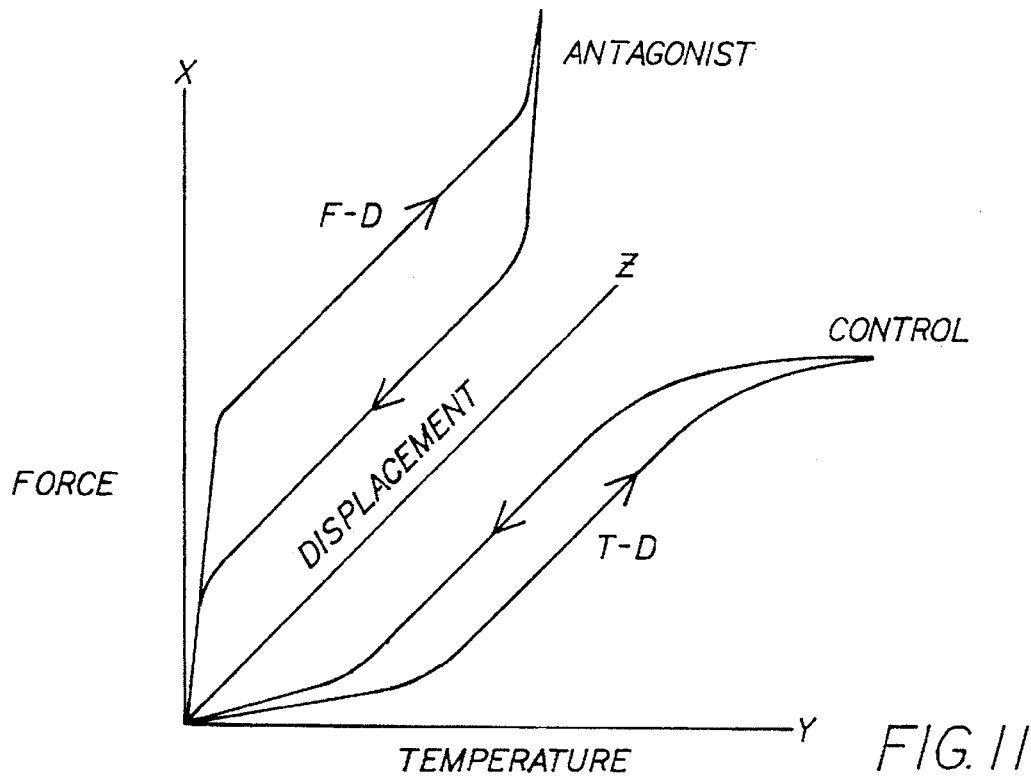
FIG. 11 is a diagram representing three dimensional space defined by force, displacement and temperature in X, Y and Z coordinates, in which antagonistic control of the shape memory actuators is depicted.

It is to be noted that FIG. 11 represents three dimensional space defined by force, displacement and temperature depicted in X, Y and Z coordinates in which antagonistic control of the shape memory actuators is described. The force displacement behavior of the antagonist at a constant temperature of 70° C., for example, is defined by the hysteresis loop labeled F-D. The behavior of the shape memory actuator under PI control is described by the hysteresis loop labeled T-D in which temperature is varied by changing the current supplied to the actuator to cause work (change in force and actuator displacement) to be generated. It is to be noted that the antagonistic behavior described herein refers to the concurrent operation of the control activator and the antagonistic actuator.

As will be observed, upon execution of a command signal to the opposite side of the neutral position, less temperature rise is required to convert antagonistic shape memory wires to control wires, significantly improving the bandwidth of the control surface. It is quite important to note that this operation advantageously brings about the removal of any slack from the control surface.

It will be observed that in FIG. 8, a perspective view of fin 60 is shown, utilizing antagonistic control of a portion of the fin surface. The fin is fabricated in its neutral fin position. A conventional compliant composite laminate 65 is bonded in the center of opposing core materials 68A and 68B. The fin has upper and lower faces 62 formed of a stiff, non-compliant laminate, with upper and lower portions 63 of the trailing edge formed of compliant material. The centrally located laminate 65 may be regarded as the backbone 69.

A set of SMA wires 64, shown by the broken dashed lines, is installed on the upper surface of the fin, oriented at an angle to allow termination at an inboard surface of the interface of the fin with a submersible craft. A matching set of SMA wires 66 is disposed in the matching lower surface of fin 60. The trailing edge terminations of the SMA wires are formed by contact bar 67, with a similar bar (not shown) at the sub-fin interface.

For the purpose of illustration, we have designated the upper facesheet in FIG. 9 as Facesheet A, with which positive displacement is associated, and the lower facesheet in FIG. 9 as Facesheet B, with which negative displacement is associated.

Differential heating of wires 64 and 66 will cause the compliant fin tip portion 63 to warp as indicated in FIG. 9, with this showing being exaggerated in the interests of clarity of explanation. As will be understood, varying the differential heating will cause panel 63 to move as shown by arrow A. In there presentation shown in solid lines in FIG. 9, wires 64 in panel 63A have contracted and wires 66 have elongated. The dashed lines show a position of the fin tip 63B with wires in panel 63A elongated and wires 66 contracted.

This mode of operation results in the antagonists always being tensioned and regardless of their state (unstressed austenite or stress induced martensite) they will always contribute in a desirable manner to the bending stiffness of the deformed foil.

If the wires or tendons were sitting idle as in the case of the temperature-induced transformation, there would be no contribution to bending stiffness since the shape memory wires would be in a relieved, non-tensed state. It is important to note that wires in a relieved condition would result from the utilization of the teachings set forth in the previously, mentioned prior art patents. It therefore follows that a stiffer control surface must be designed in the case of the temperature induced transformation, in order to provide the same operational stiffness that can be directly obtained in the antagonistic control surface. A direct result of this is that fewer shape memory wires are required to actuate the antagonistic case, with an associated decrease in actuation power requirements.

It should be further noted that a loss of power in the antagonistic case advantageously results in return of the control surface to the "fail safe" neutral position. The computer based control system is responsible for maintaining the constant temperature of the antagonists while providing control of the opposing shape memory wires. This is accomplished by flowing constant current through the antagonists while providing PI control of the opposing wires.

The significant advantages made possible by this embodiment of our invention revolve around two principal features, which are antagonistic actuation and facesheet/honeycomb/ backbone construction. Antagonistic actuation is a result of combining a computer control system with the embedded shape memory actuators. This distinct advantage is unique to the instant application in that it allows the stress induced shape memory transformation to occur rather than the more conventional mode of operation in which the facesheet actuators are simply stretched out in the martensitic condition. It is important to realize that the instant invention as well as the above-mentioned prior art devices use the temperature induced transformation.

It is most necessary to understand that the instant invention utilizes the stress induced transformation in addition to the temperature induced transformation.

When the control surface is commanded to move from some positive point of deflection through neutral to a negative point of deflection, it is necessary to switch the control methodology from PI control to antagonistic control for the positive facesheet actuators, while simultaneously switching the negative facesheet actuators from antagonistic control to PI control.

In terms of hardware, this technique involves reprogramming the positive facesheet actuator power supply to provide a constant current such that the shape memory wires are maintained at a constant temperature of 70° C. When this event occurs, it is necessary to switch or reprogram the negative facesheet power supply such that it is capable of conducting PI control.

These functions are accomplished by the control software in which the sign of the user defined setpoint (quantified positive or negative displacement command) is monitored. If this setpoint is positive, then the software issues PI signals to the positive facesheet power supply. The amplitude of these signals is controlled by the magnitude of error between the setpoint and the measured displacement of the control surface tip and by the tuning constants (proportional gain and integral reset period) associated with the PI algorithm embedded within the software.

It is to be understood that in order to conduct antagonistic control, it is necessary to maintain the negative facesheet actuators (the antagonists) at a constant temperature. This is accomplished by the software, which is responsible for issuing a command signal to the negative facesheet power supply. The amplitude of this signal is sufficient to maintain a temperature of 70° C. such that the stress induced transformation may be invoked by PI contraction of the positive facesheet actuators.

When the sign of the setpoint changes due to a user defined command signal from positive through zero (the neutral position of the control surface) to negative, the software using truth logic, switches the operational modes of both power supplies. This switching or reprogramming occurs within a short period of time, typically milliseconds, to ensure that control integrity is not lost.

Therefore, upon issuing a command signal to the actuators on the opposite side of the neutral position, less temperature rise is required to convert the antagonistic wires to actuator wires. This action translates into a higher bandwidth of operation as the shape memory transformation rate is controlled by the rate at which a temperature change can be accomplished in these materials. This important attribute is entirely missing from known prior art devices.

In addition, since the shape memory wires are always tensioned, that is, they are in a "no slack" condition, they contribute favorably in the instant invention to the bending stiffness of the control surface. If they were sitting idle as in the case of known prior art patents, there would be no contribution to bending stiffness inasmuch as the wires are in their martensitic (relieved) condition. This means that a stiffer control surface must be generated in the prior art devices to provide the same "operational stiffness," with more shape memory wires being needed in order to overcome this stiffness, with an associated increase in required power and manufacturing complexity.

With respect to the method of construction of the instant invention as shown in FIG. 8, consisting of a facesheet/ honeycomb structure attached to the backbone 69 located along the neutral position of the control surface, it is important to note that this design provides resistance to transverse shear deformation from aerodynamic or hydrodynamic loading.

Figure 10:
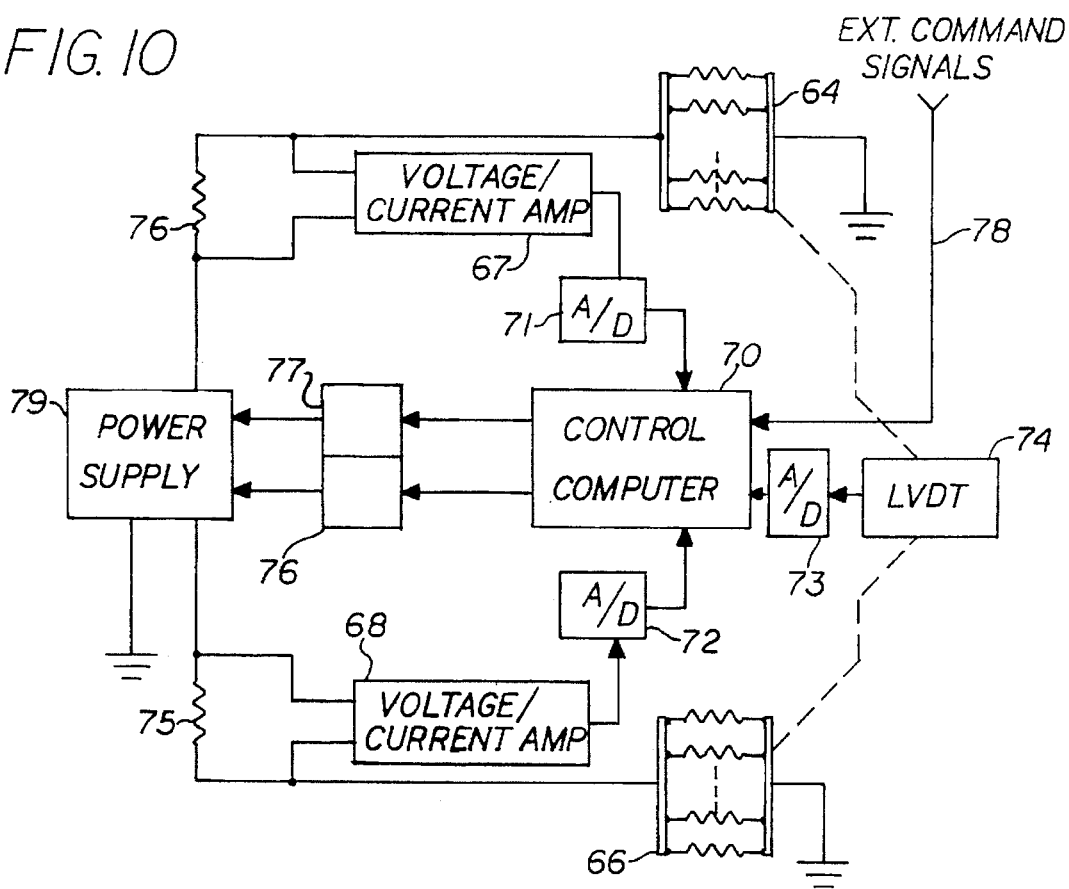
FIG. 10 is a block diagram of a typical control system for controlling the operation of the antagonistic fin of FIG. 8.

Antagonistic control of fin 60 utilizing the dual channel system is made possible by the arrangement of components represented by the block diagram of FIG. 10. Control computer 70 utilizes a proportional/integral (PI) algorithm responsive to external control signals on line 78. A linear variable displacement transformer (LVDT) 74 is coupled to the fin portion 63 to provide computer 70 with fin tip 63 position information. Computer 70 controls dual output power supply 79 via output conditioning components 76, 77 to supply differential currents to SMA wires 64, 66 depicted in FIG. 8. The currents and voltages to each set of SMA wires is input to computer 70 via voltage/current amplifiers 67, 68 and A/D converters 71, 72. A PI algorithm calculates the output signal to the high current power supply associated with the PI controlled facesheet, based on the error signal between the LVDT signal and the incoming command signal.

Figure 12:
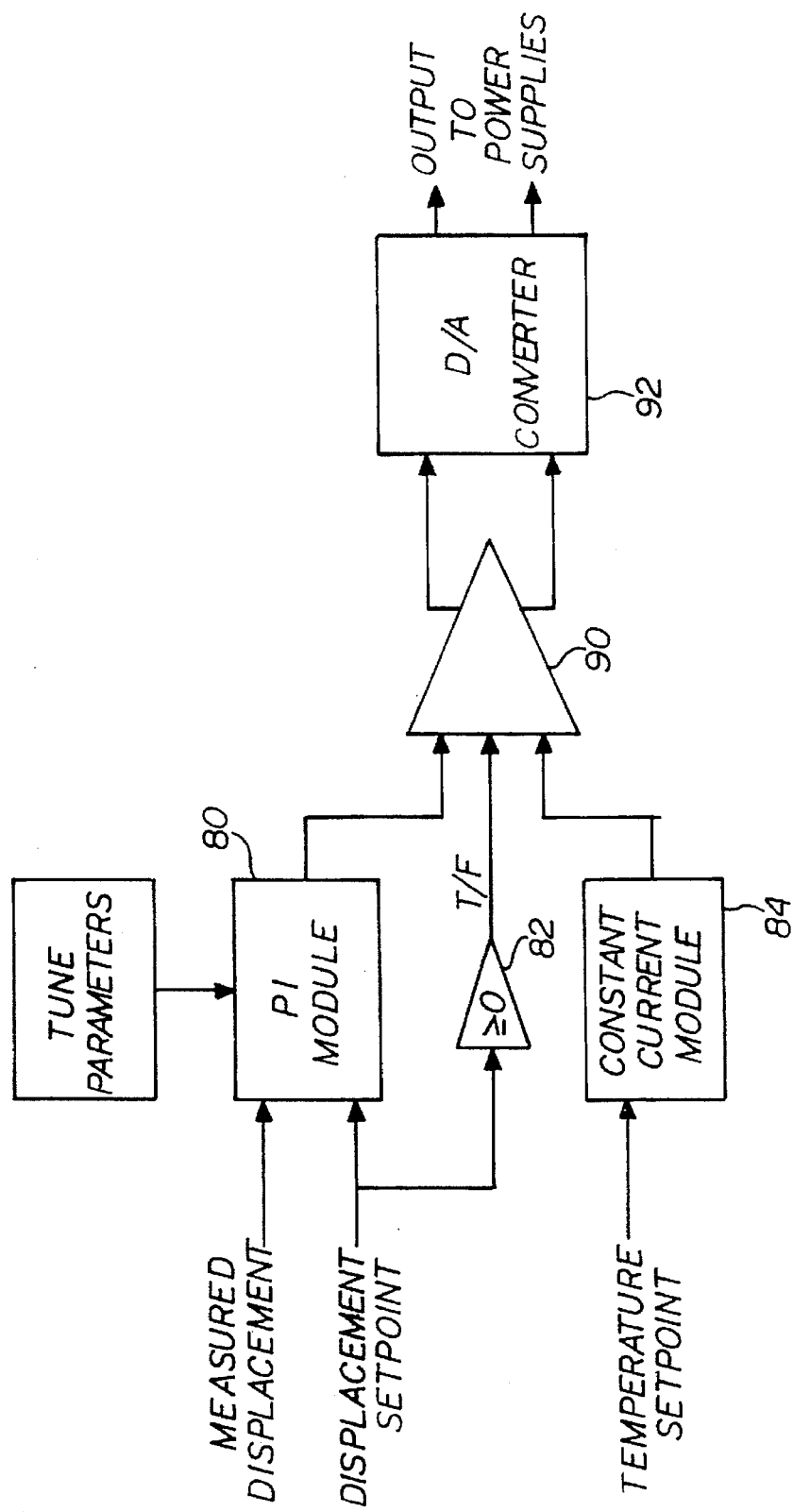
FIG. 12 is a block diagram of the program installed in the control computer in order that proportional/integral (PI) control is used for deflecting facesheet A, whereas the antagonistic actuators in facesheet B experience the stress induced martensite transformation, with temperature being regulated by flowing constant current to the antagonistic actuators.

With reference now to FIG. 12, it is to be understood that we have here shown a functional block diagram of antagonistic control software. The PI Module 80 receives the Tune Parameters, which include user defined constants such as P (proportional Band), I (Integral Reset Rate) and $\Delta t$, which is the cycle time or execution time of the algorithm.

The PI Module also receives the Measured Displacement from the A-D converter and the Displacement Setpoint, with the user defined Displacement Setpoint also being supplied to the Logic Device 82. The output of the PI Module 80 is delivered to the Switching Logic 90.

It is to be understood that the PI Module 80 contains the mathematical equations to conduct PI control. The equation has the form $$M = b + (100/P)(SP - PV)$$

where M is the manipulated variable (output of the controller)

b is the bias given by the integral action according to $$b=b_o+\Delta t(m-b_o/\Delta t+I)$$

where $b_o$ is the previous bias value established at time $t_o$, and
SP is the user defined setpoint or desired tip deflection of the control surface
PV is the process variable or the actual (measured) displacements of the control surface
The difference of SP−PV is the error that is sought to be minimized by control surface motion.

With regard to the Logic Device 82, to which the Displacement setpoint is delivered, this device determines if the Displacement Setpoint is greater than or equal to Zero. If it is, then a true (T) logic signal is issued to the Switching Logic 90. If it is not, then a False (F) signal is issued.

The Constant Current Module 84 portion of the software contains the current value necessary to maintain the antagonistic shape memory wires at 70° C., or any other temperature defined by the user. The value outputted from the Module 84 is provided to the Switching Logic 90.

The Switching Logic 90 functions to decide which of two input signals should be provided to the high current power supply associated with each respective set of tendons, via the D/A Converter 92.

With reference to the Logic Device 82, if the signal is true (T), then facesheet A (positive displacement) receives the PI signal from the PI Module 80 and facesheet B receives the signal from the Constant Current Module 84. However, when the displacement signal becomes less than zero (i.e. False), then facesheet B receives the PI signal from the PI Module 80 and facesheet A receives the signal from Constant Current Module 84.

The D to A Converter 92 serves to convert the computer based information from modules 80 or 84 to two analog signals, one each being supplied to the power supply of each respective tendon set.

It should now be obvious to those skilled in the art that an effective closed-loop control of a control surface utilizing the control circuit illustrated herein has been disclosed. Command signals are input as Variable set points through the computer interface. An error signal is generated from the difference in set point and the LVDT measured variable or wing section tip displacement. This signal, along with the current and voltage signals, is presented to the computer via the analog to digital converter where a proportional/integral (PI) algorithm is used to calculate an output signal based on the magnitude of the error signal.

The basic attributes of the program installed in the control computer 70 depicted in FIG. 10 should now be clear to those skilled in the art, with Proportional/Integral (PI) control being used to deflect facesheet A activators illustrated in FIG. 9, while the antagonistic actuators in facesheet B experience the stress induced martensite transformation at a temperature of approximately 70° C. As previously made clear, this temperature is regulated by flowing constant current to the antagonistic actuators. As the control surface goes through neutral, it is necessary to reverse the operational modes of the facesheets using switching logic based on the sign (positive or negative) of the displacement setpoint. The output signal is converted to an analog output through the dual channel digital to analog converter 92. This signal is responsible for programming a high current supply regulating current flow to the respective shape memory actuators. This current directly heats a facesheet actuator, causing it to experience a controlled change in length resulting in a desired change in tip deflection.

It is to be realized that the bandwidth for shape control of an adaptive sandwich panel is dependent on the rate of heat transfer in and out of the SMA wires. This, in turn, is a function of transient effects between the facesheet material and the SMA wires, as well as the rate of cooling of the facesheet to ambient conditions. Bandwidth improves with enhanced cooling of the facesheet but enhanced cooling requires greater power levels to maintain wire temperature for a given command position. It has been found that the winglet or compliant control surface can be cycled through most of its range of motion at about 0.1 Hz in air. This bandwidth response was improved by a factor of 5 to 10 by placing the winglet in water, albeit with an associated increase in required power to hold any particular position.

Thus, a compliant control surface or winglet having the capability to be flexed over a wide range using internal heat-controlled tendons has been provided. The compliant control surface may be used in a variety of applications, including airborne and aquatic systems. Although specific preferred embodiments of our invention have been disclosed, we are not to be limited to the dimensions or materials described. Likewise, we are not to be limited to the use of a control computer, or to the particular method of wire termination, or to the control algorithm. It is obvious that various changes in construction can be made without departing from the spirit and scope of this invention.

REFERENCES

1. Miyazaki, S. and Otsuka, K. 1989 *ISIJ International* 29 pp 353–377.
2. Perkins, J. ed 1975 *Shape Memory Effects in Alloys* (New York: Plenum).
3. Johnson, A. D. 1978 *Proc. of the NITINOL Heat Engine Conf.* NSWC MP 79-441 pp 10-1 to 10-30.
4. Proft, J. L., Melton K. N., and Duerig, T. W. "Transformal Cycling of Ni-Ti and Ni-Ti-Cu Shape Memory Alloys", Raychem Corp. to be published.

We claim:

1. A controllable contour control surface capable of being deflected to either side of a neutral point in response to a command signal comprising:
    a) a first flexible facesheet formed to a first initial contour of said control surface, and a second flexible facesheet formed to a second initial contour of said control surface;
    b) said first and second facesheets each having a set of prestrained shape memory alloy tendons embedded therein, extending from a leading edge to a trailing edge of said control surface;
    c) each set of said shape memory alloy tendons connected to a controlled source of electrical current such that tendons of said first and second facesheets can be selectively heated in an antagonistic relationship, to bring about a desired modification of the configuration of said control surface, and
    d) a computer based control system for maintaining a constant temperature of the facesheet that at a given moment is in an antagonistic mode to the other facesheet while providing control of the opposing shape memory tendons, accomplished by flowing constant current through the tendons of the antagonistic facesheet while providing proportional/integral control of said opposing tendons.

2. A controllable contour control surface capable of being deflected to either side of a neutral point in response to a command signal comprising:
    a) a first flexible facesheet formed to a first initial contour of said control surface, and a second flexible facesheet formed to a second initial contour of said control surface;

b) said first and second facesheets each having a set of prestrained shape memory alloy tendons embedded therein, extending from a leading edge to a trailing edge of said control surface;

c) the tendons of said first flexible facesheet being disposed in an antagonistic, slack free relationship to the tendons of said second flexible facesheet, d) each set of said shape memory alloy tendons connected to a controlled source of electrical current such that tendons of said first flexible facesheet can be heated separately from the heating of the tendons of said second flexible facesheet, and e) means for selectively providing proportional/integral control of the tendons of one of said facesheets while at the same time flowing constant current through the antagonistically disposed tendons of the other facesheet, thus to bring about a desired modification of the configuration of the control surface.

3. The pliant, controllable contour control surface as recited in claim 2 in which a computer based control system is utilized for maintaining a constant temperature of the tendons of the facesheet that at a given moment are in an antagonistic relationship to the tendons of the one facesheet, to establish conditions conducive to a stress induced transformation of austenite to martensite.

4. A controllable contour control surface capable of being deflected to either side of a neutral point in response to a command signal comprising:

a) a first flexible facesheet formed to a first initial contour of said control surface, and a second flexible facesheet formed to a second initial contour of said control surface;

b) said first and second facesheets each having a set of prestrained shape memory alloy tendons embedded therein, extending from a leading edge to a trailing edge of said control surface;

c) the effective stiffness of said control surface being increased by the tendons of said first flexible facesheet being disposed in an antagonistic, slack free relationship to the tendons of said second flexible facesheet, d) each set of said shape memory alloy tendons connected to a controlled source of electrical current such that tendons of said first flexible facesheet can be heated separately from the heating of the tendons of said second flexible facesheet, e) means for selectively providing proportional/integral control of the tendons of one of said facesheets while at the same time flowing constant current through the antagonistically disposed tendons of the other facesheet, thus to bring about a desired deflection of the control surface with respect to the neutral point, and f) control means for reversing the operational modes of the facesheets as said control surface moves from a deflection to one side of the neutral point, to a deflection on the other side of the neutral point, in response to a command signal.

5. The pliant, controllable contour control surface as recited in claim 4 in which a computer based control system is utilized for maintaining a constant temperature of the tendons of the facesheet that at a given moment are in an antagonistic relationship to the tendons of the one facesheet, to establish conditions conducive to the stress induced transformation from austenite to martensite, accomplished by flowing constant current through the antagonistically disposed tendons while providing proportional/integral control of the opposing tendons.

6. A controllable contour control surface capable of being deflected to either side of a neutral point in response to a command signal comprising:

a) a first flexible facesheet formed to a first initial contour of said control surface, and a second flexible facesheet formed to a second initial contour of said control surface;

b) said first and second facesheets each having a set of prestrained shape memory alloy tendons embedded therein, extending from a leading edge to a trailing edge of said control surface;

c) the effective stiffness of said control surface being increased by the tendons of said first flexible facesheet being disposed in an antagonistic, slack free relationship to the tendons of said second flexible facesheet, d) each set of said shape memory alloy tendons connected to a controlled source of electrical current such that tendons of said first flexible facesheet can be heated separately from the heating of the tendons of said second flexible facesheet, e) means for selectively providing proportional/integral control of the tendons of one of said facesheets while at the same time flowing constant current through the antagonistically disposed tendons of the other facesheet, thus to bring about a desired deflection of the control surface with respect to the neutral point, and f) control means for switching the control mode of the facesheets from proportional/integral control to antagonistic control and from antagonistic control to proportional/integral control as said control surface moves from a positive deflection through the neutral position to a negative deflection in response to a user defined setpoint.

7. The pliant, controllable contour control surface as recited in claim 6 in which a computer based control system is utilized for maintaining a constant temperature of the tendons of the facesheet that at a given moment are in an antagonistic relationship to the tendons of the other facesheet, to establish conditions conducive to the stress induced transformation of austenite to martensite, accomplished by flowing constant current through the antagonistically disposed tendons while providing proportional/integral control of the tendons of said other facesheet.

8. A submersible craft control surface comprising:

a) a first flexible facesheet forming an initial contour of said control surface, and a second flexible facesheet forming an opposing initial contour of said control surface;

b) said first and second facesheets each having a set of prestrained shape memory alloy tendons embodied therein, the tendons capable of being independently transformed between an austenite phase and a martensite phase, each of said facesheets extending from a leading edge to a trailing edge of said control surface, the tendons of said first facesheet being disposed in an antagonistic relationship to the tendons of said second facesheet;

c) each of said shape memory alloy tendons being connected to a controlled source of electrical current such that tendons of said first facesheet can be heated separately from the heating of the tendons of said second facesheet;

d) means for selectively providing proportional/integral control of the electrical current through one of said facesheets while simultaneously maintaining constant current through said antagonistically disposed tendons of the other of said facesheets, to thus modify said initial contour of the control surface as the tendons of the one facesheet transforms from said austenite phase to said martensite phase; and e) said control surface including a position sensor producing an electrical controls signal related to the displacement of a tip of said control surface.

9. The submersible craft control surface as defined in claim 8 in which said position sensor is operated by a control wire attached to a leading edge of said control surface, passing through a channel within one of said facesheets, and operatively attached to said position sensor.

10. A method for controlling aircraft and submersible craft comprising the steps of:

a) providing a first flexible facesheet forming an initial contour of said control surface, and a second flexible facesheet forming an opposing initial contour of said control surface, said first and second facesheets each having a set of prestrained shape memory alloy tendons embodied therein, the tendons of each facesheet capable of being independently transformed between an austenite phase and a martensite phase, a first of said facesheets extending from a leading edge to a trailing edge of said control surface, the tendons of said first facesheet being disposed in an antagonistic relationship to the tendons of said second facesheet;

b) connecting each of said shape memory alloy tendons to a controlled source of electrical current such that tendons of said first facesheet can be heated separately from the heating of the tendons of said second facesheet; and c) selectively providing proportional/integral control of the electrical current through the tendons of one of said facesheets while simultaneously maintaining constant current through said antagonistically disposed tendons of the other of said facesheets, to thus modify said initial contour of the control surface as the tendons of the one facesheet transform from said austenite phase to said martensite phase.

11. The method for controlling aircraft and submersible craft as recited in claim 10 which involves the further step of maintaining a constant temperature of the tendons of the facesheet that at a given moment are in an antagonistic relationship to the tendons of the other facesheet, to establish conditions conducive to the stress induced transformation from austenite to martensite, accomplished by flowing constant current through the antagonistically disposed tendons.

* * * * *